United States Patent
Choi et al.

(10) Patent No.: US 7,951,506 B2
(45) Date of Patent: May 31, 2011

(54) BIPOLAR PLATE AND DIRECT LIQUID FEED FUEL CELL STACK

(75) Inventors: Kyoung Hwan Choi, Suwon-si (KR); Jong-koo Lim, Seoul (KR); Yong-hun Cho, Gunpo-si (KR); Il Moon, Seoul (KR)

(73) Assignee: Samsung SDI Co., Ltd., Suwon (KR)

( * ) Notice: Subject to any disclaimer, the term of this patent is extended or adjusted under 35 U.S.C. 154(b) by 470 days.

(21) Appl. No.: 11/272,077

(22) Filed: Nov. 14, 2005

(65) Prior Publication Data
US 2006/0105223 A1 May 18, 2006

(30) Foreign Application Priority Data

Nov. 13, 2004 (KR) .................. 10-2004-0092809

(51) Int. Cl.
*H01M 8/04* (2006.01)
(52) U.S. Cl. ...................... 429/514; 429/518
(58) Field of Classification Search .................. None
See application file for complete search history.

(56) References Cited

U.S. PATENT DOCUMENTS

| | | | |
|---|---|---|---|
| 4,977,041 A * | 12/1990 | Shiozawa et al. .............. 429/26 |
| 6,066,408 A | 5/2000 | Vitale et al. | |
| 6,099,984 A | 8/2000 | Rock | |
| 6,309,773 B1 | 10/2001 | Rock | |
| 6,541,145 B2 | 4/2003 | Wilkinson et al. | |
| 6,586,128 B1 | 7/2003 | Johnson et al. | |
| 6,780,536 B2 * | 8/2004 | Debe et al. ...................... 429/38 |
| 7,022,430 B2 * | 4/2006 | Enjoji et al. .................... 429/39 |
| 2003/0064277 A1* | 4/2003 | Sugiura et al. .................. 429/38 |
| 2003/0211376 A1* | 11/2003 | Hatoh et al. .................... 429/32 |
| 2004/0067405 A1* | 4/2004 | Turpin et al. .................... 429/38 |
| 2004/0247983 A1* | 12/2004 | Orishima et al. ............... 429/38 |
| 2005/0186464 A1* | 8/2005 | Sugiura et al. .................. 429/38 |

FOREIGN PATENT DOCUMENTS

| | | | |
|---|---|---|---|
| JP | 2000-164230 | | 6/2000 |
| JP | 2001-250569 | | 9/2001 |
| JP | 2003-014126 | | 1/2003 |
| JP | 2003-142126 | | 5/2003 |
| JP | 2003-338299 | | 11/2003 |
| WO | WO 03/043110 | * | 5/2003 |
| WO | 2004001874 | | 12/2003 |
| WO | WO2005/057707 | * | 6/2005 |

* cited by examiner

*Primary Examiner* — Dah-Wei D Yuan
*Assistant Examiner* — Maria J Laios
(74) *Attorney, Agent, or Firm* — H.C. Park & Associates, PLC

(57) ABSTRACT

A bipolar plate for fuel cells includes a plurality of flow paths in which fuel flows. The flow paths include a first flow path formed by a plurality of flow channels and a second flow path formed by a plurality of islands. A direct liquid fuel cell stack comprises the bipolar plate.

18 Claims, 4 Drawing Sheets

BIPOLAR PLATE AND DIRECT LIQUID FEED FUEL CELL STACK

BACKGROUND OF THE INVENTION

This application claims priority to and the benefit of Korean Patent Application No. 10-2004-0092809, filed on Nov. 13, 2004, in the Korean Intellectual Property Office, the disclosure of which is incorporated herein in its entirety by reference.

1. Field of the Invention

The present invention relates to a bipolar plate and a direct liquid feed fuel cell stack comprising the same.

2. Description of the Background

A direct liquid feed fuel cell generates electrical power by electrochemical reactions between an organic fuel such as methanol or ethanol and an oxidant such as oxygen. The fuel cell has high energy density and high power density. Since the direct liquid feed fuel cell uses the fuel directly, external peripheral devices such as a fuel reformer are not required and the fuel can be easily stored and supplied.

As illustrated in FIG. 1, a single direct liquid feed fuel cell includes a membrane-electrode-assembly (MEA) structure having an electrolyte membrane 1 interposed between an anode 2 and a cathode 3. The anode 2 and the cathode 3 include fuel diffusion layers 22 and 32 for supply and diffusion of fuel, catalyst layers 21 and 31 to aid an oxidation-reduction reaction of fuel at the electrodes, and electrode supporting layers 23 and 33, respectively.

The catalyst layers 21 and 31 may comprise a noble metal such as Pt that has excellent electrochemical properties even at low temperatures. To prevent catalytic poisoning due to carbon monoxide in the reaction byproducts, alloys that include transition metals such as Ru, Rh, Os, or Ni may also be used. The electrode supporting layers 23 and 33 are made of carbon paper or carbon cloth and their surfaces are wet-proofed for easy supply of fuel and discharge of reaction products. The electrolyte membrane 1 may be a polymer membrane with a thickness of 50 μm to 200 μm. A proton exchange membrane that retains moisture and has ionic conductivity is usually used as the electrolyte membrane 1.

A direct methanol fuel cell (DMFC) operates by an electrochemical reaction between methanol and water. At an anode reaction, fuel is oxidized and at a cathode reaction, oxygen is reduced by protons and electrons. The reactions are as follows:

Anode Reaction: $CH_3OH+H_2O \rightarrow CO_2+6H^++6e^-$

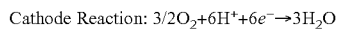
Cathode Reaction: $3/2O_2+6H^++6e^- \rightarrow 3H_2O$

Overall Reaction: $CH_3OH+3/2O_2 \rightarrow 2H_2O+CO_2$

Methanol reacts with water at the anode 2 to produce carbon dioxide, protons, and electrons. The produced protons migrate to the cathode 3 through the electrolyte membrane 1, which can be a proton exchange membrane, and react with oxygen and electrons, which are supplied via an external circuit, at the cathode 3 to produce water. Overall, in the DMFC, water and carbon dioxide are produced through the reaction of methanol with oxygen.

The theoretical voltage generated in a DMFC single cell is approximately 1.2 V. However, the open circuit voltage at room temperature and atmospheric pressure is 1 V or less and the actual operating voltage is approximately 0.4 V to 0.6 V because there is a voltage drop due to activation overpotential and resistance overpotential. Thus, to obtain a desirably high voltage, several single cells are connected in series.

A stacked cell is obtained by stacking several single cells that are connected in series. In this configuration, a conductive bipolar plate 4 is interposed between single cells to electrically connect adjacent single cells.

A graphite block that has good electric conductivity, mechanical strength, and machining properties is usually used as the bipolar plate 4. A block of a composite material comprising metal or a conductive polymer may also be used. Flow channels 41 and 42 that separately supply fuel (methanol) and air, respectively, to the anode 2 and cathode 3 are formed on both sides of the bipolar plate 4. The bipolar plate 4 is positioned in the middle of the stack between adjacent single cells, and end plates (not shown) which are monopolar plates that supply fuel or oxygen to the electrodes 2 or 3, are disposed at ends of the stack. Flow channels 41 and 42 that supply air and fuel to adjacent single cells are formed in the end plates.

FIG. 2 is a plan view of the bipolar plate in which liquid fuel channels, for example, are formed.

As shown in FIG. 2, in the conventional bipolar plate 4, a plurality of serpentine fuel flow channels 41 are formed in an electrode region 47 in which an MEA is disposed. Outside the electrode region 47, a manifold 46 connected to entrances and exits of the fuel flow channels 41 and fuel pathway holes 43a, 43b, 44a, and 44b penetrating the bipolar plate 4 are formed. The fuel pathway holes 43a, 43b, 44a, and 44b are connected to the manifold 46 to supply or discharge the liquid fuel or an oxidant. That is, the fuel pathway holes 43a and 43b, respectively, act as an inlet and outlet for the liquid fuel and the fuel pathway holes 44a and 44b, respectively, act as an inlet and outlet for the oxidant.

The serpentine flow channel illustrated in FIG. 2 and the fuel channels disclosed in U.S. Pat. Nos. 6,309,773 and 6,099,984 have a bending angle of 90°, which causes a large pressure loss of the fluid in the fuel flow channels 41.

In addition, U.S. Pat. Nos. 6,541,145 and 6,586,128 disclose flow channels formed by islands, and liquid or air flows in a space between islands. Such a structure reduces the size of the water droplets and bubbles that are discharged at an anode and a cathode, which facilitates fluid flow. However, it is difficult for these flow channels to uniformly supply fuel to an MEA due to their small relative areas.

SUMMARY OF THE INVENTION

The present invention provides a bipolar plate that reduces a fluid's pressure loss and provides uniform fluid velocity.

The present invention also provides a direct liquid feed fuel cell stack that includes a plurality of the bipolar plates.

Additional features of the invention will be set forth in the description which follows, and in part will be apparent from the description, or may be learned by practice of the invention.

The present invention discloses a bipolar plate that includes a plurality of flow paths in which fuel flows. The flow paths include a first flow path formed by a plurality of flow channels and a second flow path formed by a plurality of islands.

The present invention also discloses direct liquid feed fuel cell stack including a plurality of membrane-electrode assemblies (MEAs). Each MEA includes an anode, a cathode, and an electrolyte membrane interposed between the anode and the cathode. The MEA further includes a plurality of bipolar plates that are disposed such that the MEAs are interposed between the bipolar plates. Each bipolar plate includes a plurality of flow paths that supply a fuel or oxidant to the anode and the cathode. The flow paths include a first flow path formed by a plurality of flow channels and a second flow path formed by a plurality of islands.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
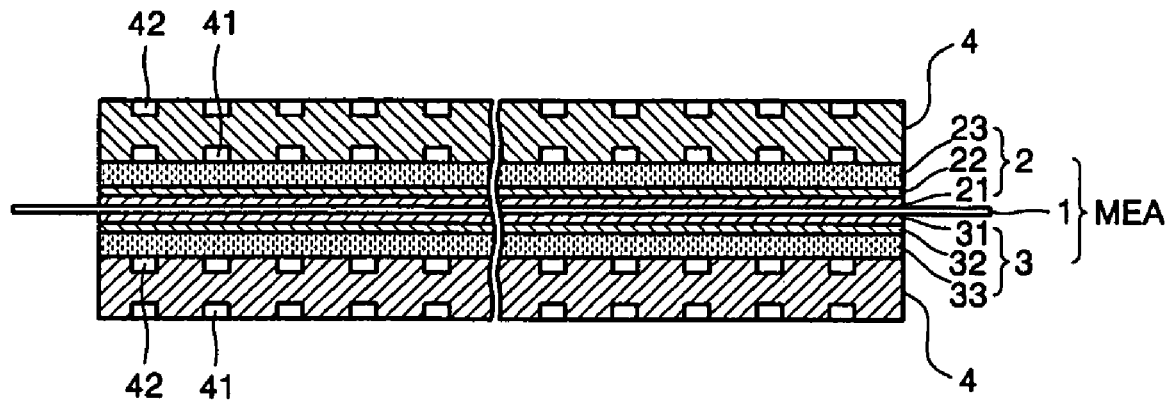
FIG. 1 is a cross-sectional view of a general direct liquid feed fuel cell.
Figure 2:
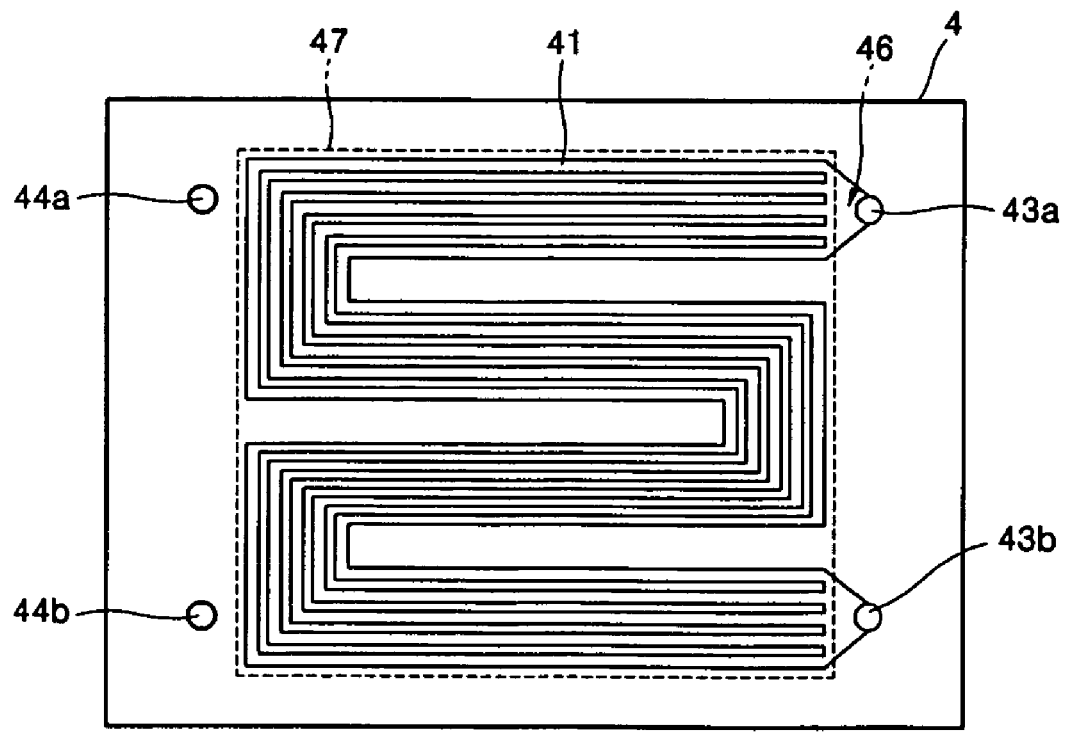
FIG. 2 is a plan view of a conventional bipolar plate.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity.

It will be understood that when an element such as a layer, film, region or substrate is referred to as being "on" another element, it can be directly on the other element or intervening elements may also be present. In contrast, when an element is referred to as being "directly on" another element, there are no intervening elements present.

The bipolar plate of the present invention may reduce pressure loss of a fluid and break bubbles to increase fuel supply efficiency in a predetermined area. In addition, uniform flow of fluid can be obtained.

The direct liquid feed fuel cell stack of the present invention includes bipolar plates that reduce the bubble size to efficiently supply a liquid fuel, and reduce pressure loss.

Figure 3:
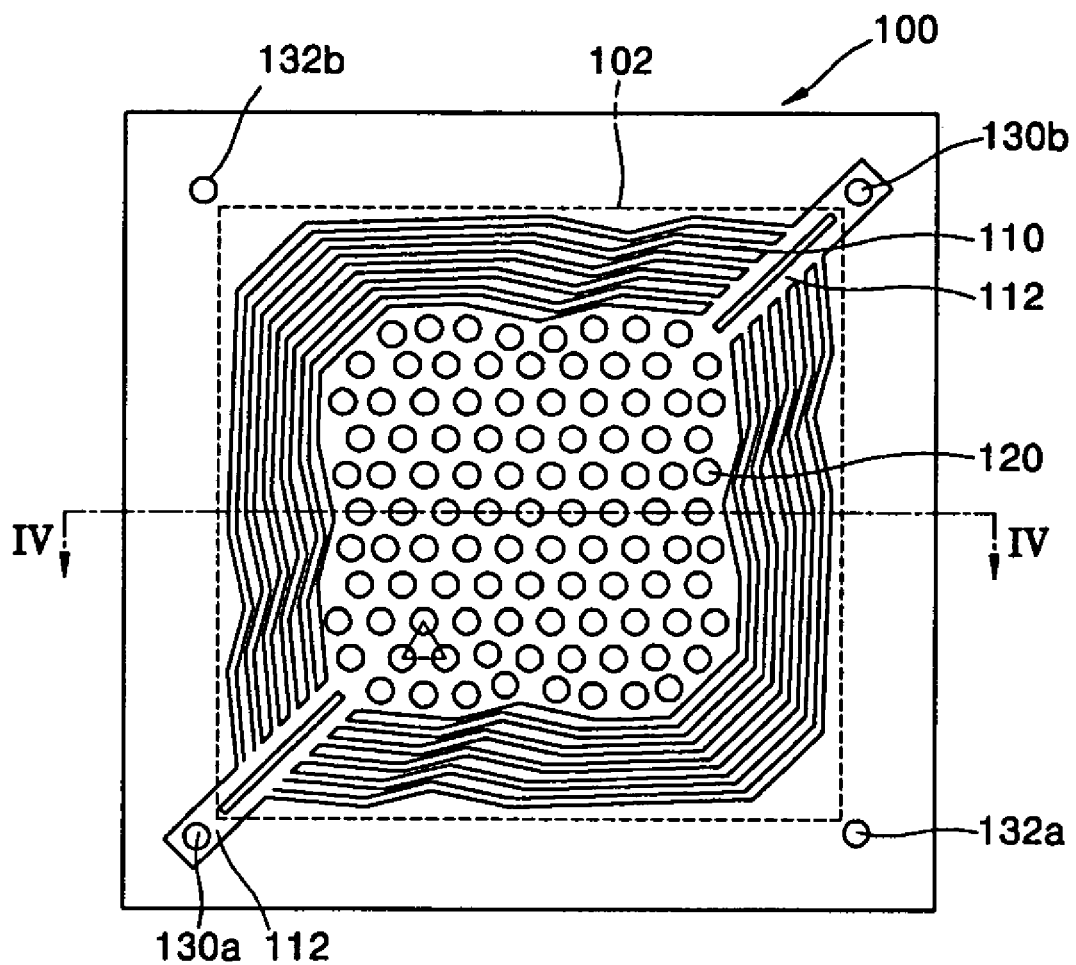
FIG. 3 is a plan view of a bipolar plate according to an exemplary embodiment of the present invention.
Figure 4:
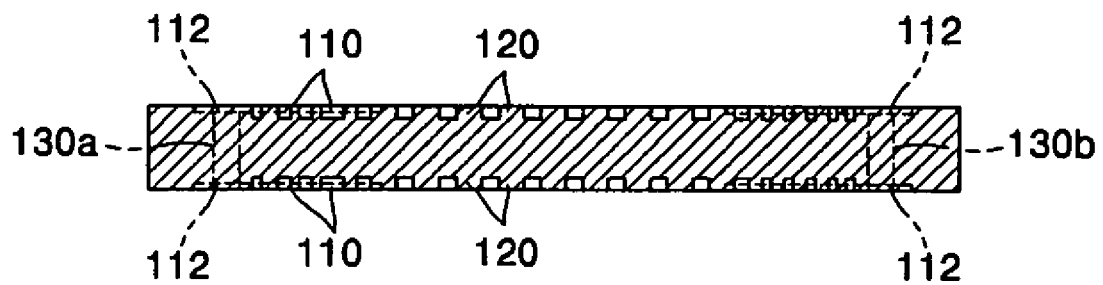
FIG. 4 is a cross-sectional view taken along line IV-IV of FIG. 3.

FIG. 3 is a plan view of a surface of a bipolar plate 100 according to an exemplary embodiment of the present invention on which flow channels of liquid fuel may be formed. FIG. 4 is a cross-sectional view taken along line IV-IV of FIG. 3.

Referring to FIG. 3 and FIG. 4, a flow path for liquid fuel is formed on the upper surface of the bipolar plate 100 and a flow path for the oxidant (air) is formed on the lower surface of the bipolar plate 100. The flow path includes a first flow path formed by a plurality of flow channels 110 that are formed in a peripheral portion of an electrode region 102 in which an MEA (see FIG. 1) is disposed and a second flow path formed by a plurality of islands 120. The second flow path is surrounded by the first flow path. That is, the islands 120 are surrounded by the flow channels 110. Each of the islands 120 may have a cylindrical shape.

Entrances and exits of the flow channels 110 are connected to manifolds 112. The manifold 112 is a pathway for supplying or removing a liquid fuel or oxidant and is connected to fuel pathway holes 130a, 130b, 132a, and 132b, which penetrate the bipolar plate 100. The fuel pathway holes 130a and 130b act as an inlet and an outlet, respectively, of a liquid fuel and the fuel pathway holes 132a and 132b act as an inlet and an outlet, respectively, of an oxidant.

A plurality of curves are formed from the fuel pathway hole 130a to the fuel pathway hole 130b in each of the flow channels 110. The flow channels bend at angles of about 45° or less, which reduces pressure loss of the fluid. The flow channel 110 has a wave shape and its width varies between about 0.5 mm and about 1.5 mm. Such a variation in the width facilitates fluid pumping.

To have sufficient area that contacts the MEA, the diameter of each of the islands 120 may be less than a distance between the islands 120. Three of the islands 120 that neighbor each other may form a triangle to restrict the size of bubbles in the fluid. The islands 120 break bubbles of $CO_2$ that are produced in an anode reaction to facilitate the supply of fuel to the MEA. The islands 120 may break water droplets that are produced in a cathode reaction.

In the bipolar plate 100, the velocity of the fluid passing through the flow channels 110 and the velocity of fluid passing through the islands 120 were set to be substantially the same.

Figure 5:
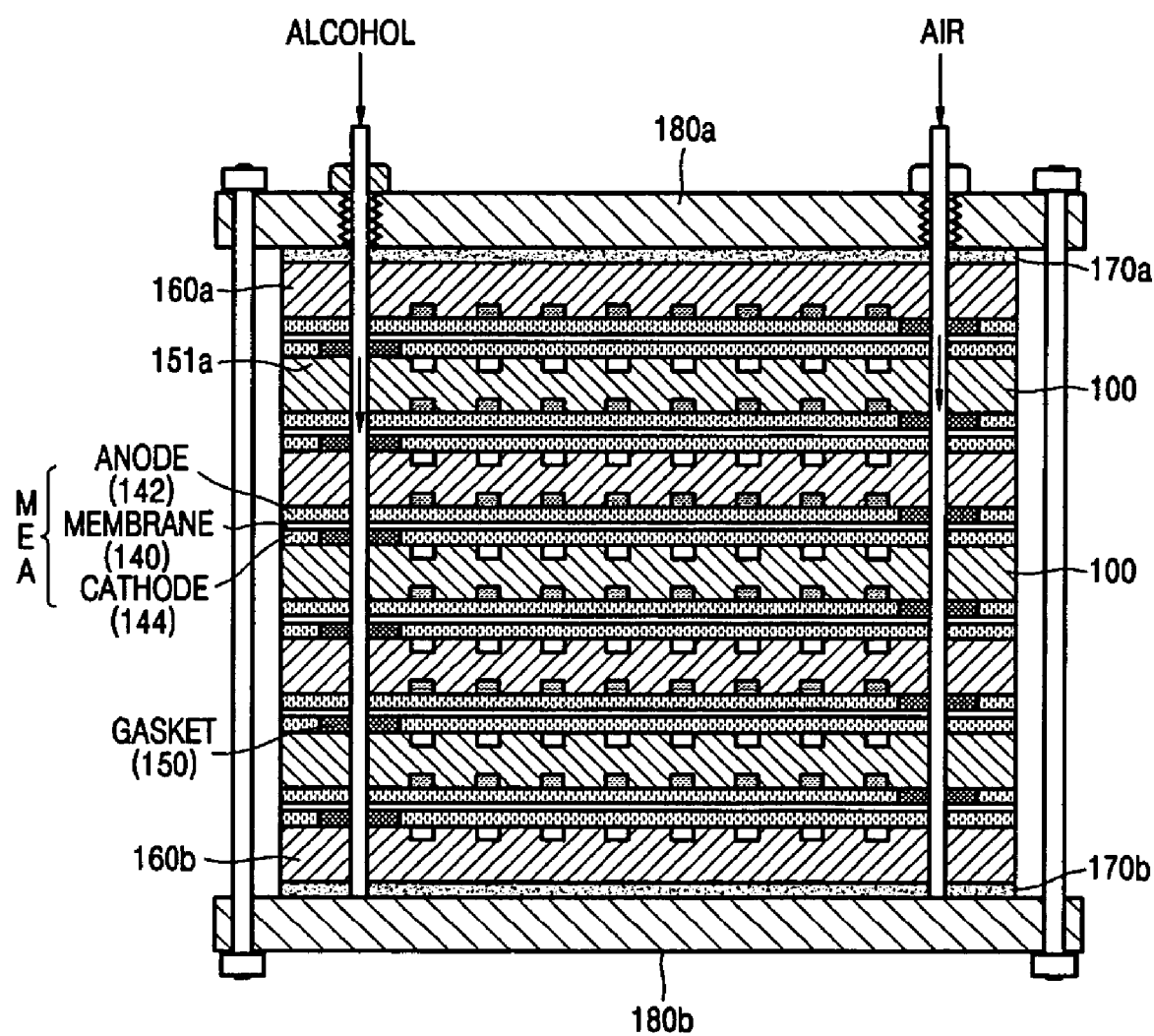
FIG. 5 is a cross-sectional view of a direct liquid feed fuel cell stack including a plurality of the bipolar plates shown in FIG. 1, according to an exemplary embodiment of the present invention.

FIG. 5 is a cross-sectional view of a direct liquid feed fuel cell stack including a plurality of the bipolar plates 100.

As shown in FIG. 5, the fuel cell stack includes a plurality of stacked MEAs and a conductive bipolar plate 100 is interposed between the MEAs. Each of the MEAs includes a membrane 140 interposed between an anode 142 and a cathode 144. End conductive plates 160a and 160b are disposed above and below the stack, respectively. Only one surface of each of the end conductive plates 160a and 160b contacts one of the MEAs. Thus, the end conductive plates 160a and 160b have a surface with the same shape as a surface of the bipolar plate 100, and their functions are the same as the bipolar plate 100. Current collectors 170a and 170b are positioned on outer surfaces of the end conductive plates 160a and 160b. MEAs, bipolar plates 100, end conductive plates 160a and 160b, and current collectors 170a and 170b are coupled by fixation end plates 180a and 180b through screws.

A sealant 150 such as a gasket prevents a liquid fuel or oxidant (air) from the fuel pathway holes 130a, 130b, 132a, and 132b from contacting the anode 142 or the cathode 144.

Figure 6:
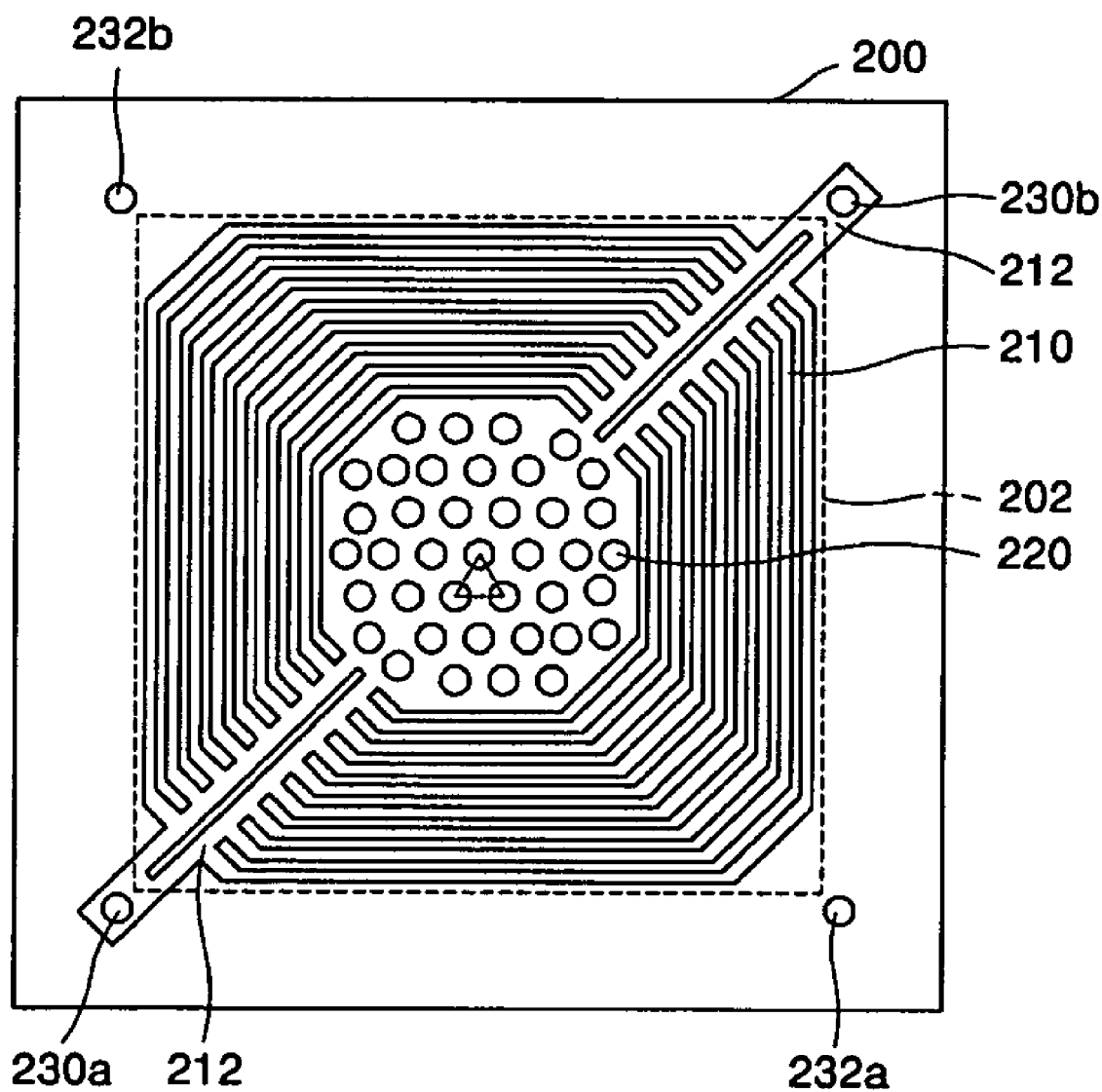
FIG. 6 is a plan view of a bipolar plate according to another exemplary embodiment of the present invention.

FIG. 6 is a plan view of a surface of a bipolar plate according to another exemplary embodiment of the present invention on which a flow path of liquid fuel may be formed.

Referring to FIG. 6, a flow path where liquid fuel flows is formed on the upper surface of the bipolar plate 200. The flow path includes a first flow path formed by a plurality of flow channels 210 that are formed in a peripheral portion of an electrode region 202 in which an MEA is disposed and a second flow path formed by a plurality of islands 220. The second flow path is surrounded by the first flow path and the islands 220 are surrounded by the flow channels 210.

Entrances and exits of the flow channels 210 are connected to manifolds 212. The manifold 212 is a pathway for supplying or removing a liquid fuel or oxidant and is connected to fuel pathway holes 230a, 230b, 232a, and 232b, which penetrate the bipolar plate 200. The fuel pathway holes 230a and 230b act as an inlet and an outlet, respectively, of a liquid fuel and the fuel pathway holes 232a and 232b act as an inlet and an outlet, respectively, of an oxidant.

A plurality of curves are formed from the fuel pathway hole 230a to the fuel pathway hole 230b in the flow channels 210 of the first flow path. The curves continuously bend at angles of about 45° in one direction. The small angles of the curves reduces pressure loss of fluid.

The width of the flow channel 210 varies between about 0.5 mm and about 1.5mm. Such a variation of width facilitates fluid pumping.

To obtain a sufficient area that contacts the MEA, the diameter of each of the islands 220 may not be greater than a distance between the islands 220. Three of the islands 220 that neighbor each other may form a triangle to restrict the size of bubbles in the fluid. The islands 220 break bubbles of $CO_2$ that are produced in an anode reaction to facilitate the supply of fuel to the MEA. The islands 220 can break water droplets that are produced in a cathode reaction.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A bipolar plate for fuel cells, comprising:
a plurality of flow paths in which fuel flows,
wherein the plurality of flow paths comprise:
a first flow path formed in a peripheral portion of the bipolar plate by a plurality of flow channels; and
a second flow path formed by a plurality of islands surrounded by the first flow path,
wherein the plurality of islands are arranged between a first end of each flow channel and a second end of each flow channel,
wherein the first end is opposite the second end,
wherein each flow channel is continuous between the first end and the second end, and
wherein the plurality of islands are not disposed within the plurality of flow channels.

2. The bipolar plate of claim 1,
wherein each of the flow channels has a plurality of curves that bend at angles of about 90° or less.

3. The bipolar plate of claim 2,
wherein the flow channels bend at angles of about 45° or less.

4. The bipolar plate of claim 1,
wherein each of the islands has a cylindrical shape.

5. The bipolar plate of claim 1,
wherein three adjacent islands in a flow direction of a fuel or oxidant form a triangle.

6. The bipolar plate of claim 1,
wherein a diameter of each of the islands is less than a distance between the islands.

7. The bipolar plate of claim 2,
wherein each of the flow channels has a wave shape.

8. The bipolar plate of claim 7,
wherein a width of the first flow path varies repeatedly.

9. The bipolar plate of claim 7,
wherein the curves bend in one direction.

10. A direct liquid feed fuel cell stack, comprising:
a plurality of membrane-electrode assemblies (MEAs), each comprising:
an anode;
a cathode; and
an electrolyte membrane interposed between the anode and the cathode;
and
a plurality of bipolar plates disposed such that the MEAs are interposed between the bipolar plates,
wherein the bipolar plates comprise a plurality of fuel paths that supply a fuel or an oxidant to the anode and the cathode;
wherein the plurality of fuel paths comprise:
a first flow path formed in a peripheral portion of the bipolar plate by a plurality of flow channels; and
a second flow path formed by a plurality of islands surrounded by the first flow path,
wherein each flow channel extends from a first end to a second end of the bipolar plate,
wherein the first end is opposite the second end,
wherein each flow channel is continuous between the first end and the second end, and
wherein the plurality of islands are not disposed within the plurality of flow channels.

11. The direct liquid feed fuel cell stack of claim 10,
wherein each of the flow channels has a plurality of curves that bend at angles of about 90° or less.

12. The direct liquid feed fuel cell stack of claim 11,
wherein the flow channels bend at angles of about 45° or less.

13. The direct liquid feed fuel cell stack of claim 10,
wherein each of the islands has a cylindrical shape.

14. The direct liquid feed fuel cell stack of claim 10,
wherein three adjacent islands in a flow direction of a fuel form a triangle.

15. The direct liquid feed fuel cell stack of claim 10,
wherein a diameter of each of the islands is less than a distance between the islands.

16. The direct liquid feed fuel cell stack of claim 11,
wherein each of the flow channels has a wave shape.

17. The direct liquid feed fuel cell stack of claim 16,
wherein a width of the first flow path varies.

18. The direct liquid feed fuel cell stack of claim 16,
wherein the curves bend in one direction.

* * * * *